United States Patent [19]
Sobey et al.

[11] Patent Number: 6,163,419
[45] Date of Patent: Dec. 19, 2000

[54] METHOD AND APPARATUS FOR DEMODULATING A SERVO BURST SIGNAL IN A HARD DISK DRIVE

[75] Inventors: Charles H. Sobey, Plano; Echere Iroaga, Dallas, both of Tex.

[73] Assignee: Texas Instruments Incorporated, Dallas, Tex.

[21] Appl. No.: 09/053,869

[22] Filed: Apr. 1, 1998

[51] Int. Cl.$^7$ .............................. G11B 5/02; G11B 5/09; G11B 5/035

[52] U.S. Cl. ................................ 360/29; 360/46; 360/65

[58] Field of Search .............................. 360/29, 46, 65, 360/51, 77.05, 77.08

[56] References Cited

U.S. PATENT DOCUMENTS

| | | |
|---|---|---|
| 5,416,432 | 5/1995 | Lewis et al. . |
| 5,793,556 | 8/1998 | Freitas ................................... 360/77.08 |
| 5,854,714 | 12/1998 | Reed et al. ................................. 360/51 |

OTHER PUBLICATIONS

Nagaraj, et al., "A Median Peak Detecting Analog Signal Processor for Hard Disk Drive Servo", Journal of Solid–State Circuits, vol. 30, No. 4, Apr. 1995, pp. 461–470.

Tuttle, et al., "A 130MB/s PRML Read/Write Channel with Digital–Servo Detection", 1996 IEEE International Solid–State Circuits Converence, pp. 48–49, 64–65 and 419.

Alini, et al., "SA19.3: A 200MSample/s Trellis–Coded PRML Read/Write Channel with Digital Servo", 1997 IEEE International Solid–State Circuits Conference, pp. 318–319, 478.

Huang, et al. "SA19.7: A 20MHZ BiCMOS Peak Detect Pulse Qualifier and Area Detect Servo Demodulator for Hard Disk Drive Servo Loop", 1997 IEEE International Solid–State Circuits Conference, pp. 326–327.

*Primary Examiner*—W. Chris Kim
*Attorney, Agent, or Firm*—W. Daniel Swayze, Jr.; Wade James Brady, III; Frederick J. Telecky, Jr.

[57] ABSTRACT

A hard disk drive system (10) includes a read head (21) for reading information from a rotating magnetic disk (12). The read head outputs a servo burst signal in response to servo information (59) on the disk. An analog-to-digital converter (33) is provided to oversample the servo burst signal during each of a plurality of successive time intervals, in order to obtain a plurality of samples for each such time interval. An accumulator (74) is provided to sum the samples for each time interval, in order to obtain for each time interval a respective accumulation value that represents an integration of the burst signal for that time interval. A filtering circuit (86) is provided to determine a burst value for the servo burst signal, by applying a filtering function to a set of the accumulation values. The filtering function may involve determining a median accumulation value from the set of accumulation values, or determining a mean of the accumulation values in the set.

15 Claims, 5 Drawing Sheets

METHOD AND APPARATUS FOR DEMODULATING A SERVO BURST SIGNAL IN A HARD DISK DRIVE

TECHNICAL FIELD OF THE INVENTION

This invention relates in general to hard disk drive systems and, more particularly, to a method and apparatus for demodulating a servo burst signal read from a hard disk by a read head.

BACKGROUND OF THE INVENTION

A hard disk drive system includes a rotating magnetic disk having information stored thereon, the information including servo burst information. A read head is movably supported adjacent the magnetic disk, for reading the information from the disk. A servo burst demodulation circuit is provided to process a servo burst signal generated by the read head in response to the servo information on the disk, in order to determine a strength or burst value of the servo burst signal from the read head.

One technique for demodulating the servo burst signal is to rectify the burst signal and to then apply it to an analog circuit which includes a capacitor. The capacitor is slowly charged during the duration of the rectified servo burst signal, the resulting level of charge on the capacitor being representative of the strength or burst value of the servo burst signal. In effect, this approach involves analog integration of the burst signal, in order to determine its total energy.

However, the servo burst signal may have abnormalities, for example due to problems such as dropins, drop-outs, fading, thermal asperity, and burst signal asymmetry. These abnormalities can produce erroneous results, by causing the capacitor to be undercharged or overcharged. In this regard, the level of charge on the capacitor is particularly sensitive to the last portion of a burst signal, where a noise spike or the like can cause the capacitor to be significantly overcharged in a very short time interval. Thus, this known approach of charging a capacitor involves sensitivity to noise and signal irregularities. Further, it requires a relatively significant amount of analog circuitry in the read channel.

Another known technique is to oversample the burst signal and to add up the absolute value of all the samples for the entire burst signal. In effect, this approach involves digital integration of the burst signal, in order to determine its total energy. However, this approach is also highly sensitive to signal irregularities of the type discussed above.

Yet another known approach is to carry out an analog median filtering, in particular by implementing an analog peak detection for each cycle of the servo burst signal, by switching the rectified analog burst signal successively to many different capacitors during respective cycles of the servo burst signal, and then selecting in the analog domain the capacitor having a charge level representing the median of the charge levels on all of the capacitors. The voltage on the selected capacitor is then digitized to convert the median value to the digital domain. This approach requires a substantial amount of circuitry, including the capacitors, the circuitry for switching the analog signal among the capacitors, and the circuitry for determining the median value of the charge levels on the capacitors. Further, it typically requires special analog circuitry for determining the zero-crossing points of the burst signal, in order to synchronize the switching among the capacitors to the burst signal. Moreover, the capacitors which are charged at the beginning of the servo burst signal will have a charge level that tends to decay during the remainder of the servo burst signal, thereby introducing inaccuracy into the subsequent attempt to determine a median value.

Although these known approaches have been generally adequate for their intended purpose, they have not been satisfactory in all respects. Some are sensitive to noise, and none are sufficiently effective in overcoming problems due to drop-ins, drop-outs, fading, signal asymmetries, and thermal asperity. The circuitry required can be relatively complex, and provides little or no flexibility for fine tuning the particular approach to a specific application.

SUMMARY OF THE INVENTION

From the foregoing, it may be appreciated that a need has arisen for a method and apparatus for demodulating a servo burst signal of a disk drive, which involves reduced circuitry, good noise rejection, and flexibility to allow adjustment for different applications, and which can effectively detect and/or correct problems such as drop-ins, drop-outs, fading, signal asymmetry and thermal asperity. According to the present invention, a method and apparatus are provided to address this need, and involve: oversampling the servo burst signal during each of a plurality of successive time intervals, in order to obtain a plurality of samples for each such time interval; summing the plurality of samples for each such time interval in order to obtain a respective accumulation value for that time interval; and determining a burst value for the servo burst signal by applying a filtering function to a set of the accumulation values.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
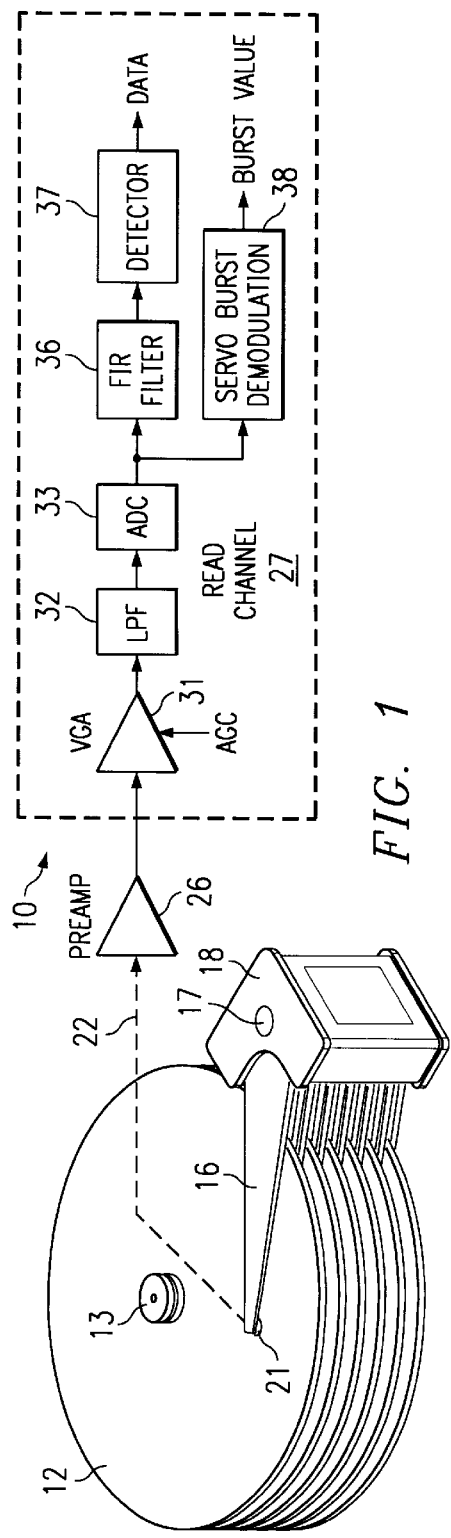
FIG. 1 is a block diagram of part of a hard disk drive system which embodies the present invention.

FIG. 1 is a diagrammatic view of part of a hard disk drive system 10 that embodies the present invention. The system 10 includes a plurality of magnetic disks 12, which are fixedly secured to a spindle 13 that is rotationally driven by a not-illustrated spindle motor. A plurality of arms 16 are supported for pivotal movement about an axis defined by a pivot axle 17, pivotal movement of the arms 16 being effected under control of a voice coil motor 18. At the outer end of each arm is a read/write head 21. The head 21 includes respective portions which serve as a read head and a write head.

As shown diagrammatically at 22, the output of the read head is coupled to an input of a preamplifier 26. The output of the preamplifier 26 is coupled to an input of a read channel circuit 27. The read channel circuit 27 includes a variable gain amplifier (VGA) 31, which facilitates an automatic gain control (AGC) function. The input to the VGA 31 is coupled to the output of the preamplifier 26, and the output of the VGA 31 is coupled to an input of a low pass filter (LPF) 32. The output of the LPF 32 is coupled to the input of an analog-to-digital converter (ADC) 33. The output of the ADC 33 is coupled to an input of a finite input response (FIR) filter 36, the output of which is coupled to an input of a digital data detector 37.

The output of the ADC 33 is also coupled to an input to a servo burst demodulation circuit 38. Alternatively, the input to the servo burst demodulation circuit 38 could be coupled to the output of the FIR. filter 36, rather than to the output of the ADC 33. The outputs of the detector circuit 37 and demodulation circuit 38 are both coupled to a not-illustrated control circuit, such as a digital signal processor.

The information stored on the magnetic disk 12 is organized in the form of a plurality of circular tracks which are arranged concentrically with respect to each other. Pivotal movement of the arm 16 causes the head 21 to move radially of the disk 12, so that the head can be radially aligned with a selected one of the tracks. Each of the tracks has portions which store data, and portions which store servo information. The servo information allows the system to identify a selected track, and to achieve and maintain radial alignment of the head 21 with that selected track.

Figure 2:
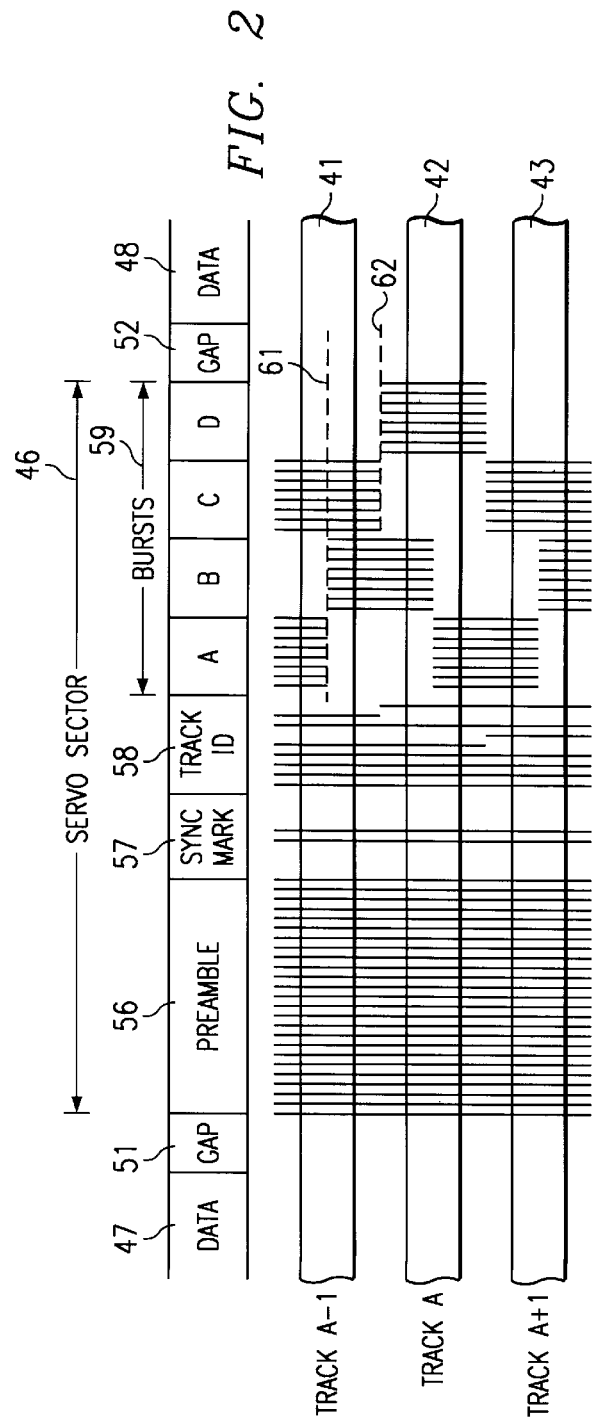
FIG. 2 is a diagrammatic view of a portion of a servo sector stored on a hard disk which a component of the system of FIG. 1.

More specifically, with reference to FIG. 2, selected portions of three tracks are shown diagrammatically at 41–43. As mentioned above, each track is circular, but the portion of each track depicted in FIG. 2 is so short that it appears to be linear in FIG. 2. Each track has a servo sector 46, which is disposed between respective sectors 47 and 48 that store data, and which is spaced from the data sectors 47 and 48 by respective gaps 51 and 52.

With reference to FIG. 1, the servo burst demodulation circuit 38 processes the servo information stored in the servo sector 46, and the filter 36 and the detector 37 process data such as that stored in the sectors 47 and 48. Circumferentially aligned servo sectors from all of the tracks are sometimes referred to collectively as a servo wedge.

The servo sector 46 begins with a preamble 56, followed successively by a sync mark 57, a track identification 58, and four burst signals 59, which are respectively identified as burst A, burst B, burst C, and burst D. The preamble 56 is intended to provide a convenient pattern for establishing proper gain and timing. The sync mark 57 is used as a timing signal, in order to facilitate accurate reading of the bursts 59, as well as data which follows them. The track identification 58 is a unique code which is different for each of the tracks on the disk.

The burst signals 59 are each a signal having a single predetermined frequency. Further, the burst signals 59 have a specific radial positioning with respect to each other and the tracks. For example, with reference to the centerline 61 of the track 41, it will be noted that the burst A signal and burst B signal are disposed on opposite sides of the centerline 61. If the read/write head 21 (FIG. 1) is accurately centered on the track 41, the burst A and burst B signals will have approximate equal strengths when they are read. On the other hand, if the read/write head 21 is not accurately centered on the track 41, one of the burst A signal and burst B signal will be stronger when they are read by the read/write head 21, and this differential can be used to determine the distance and direction of the head from the track center, and to bring the head into centered alignment with respect to that track.

Similarly, the burst C and burst D signals are disposed on opposite sides of a centerline 62 located between tracks 41 and 42. The centerline 62 may be viewed as the line along which the edge of track 41 abuts the edge of track 42. If the read/write head 21 reads the burst C and burst D signals as having equal strengths, then the read/write head 21 is disposed exactly between two tracks and is not in a position to read or write data to or from the disk.

Figure 3:
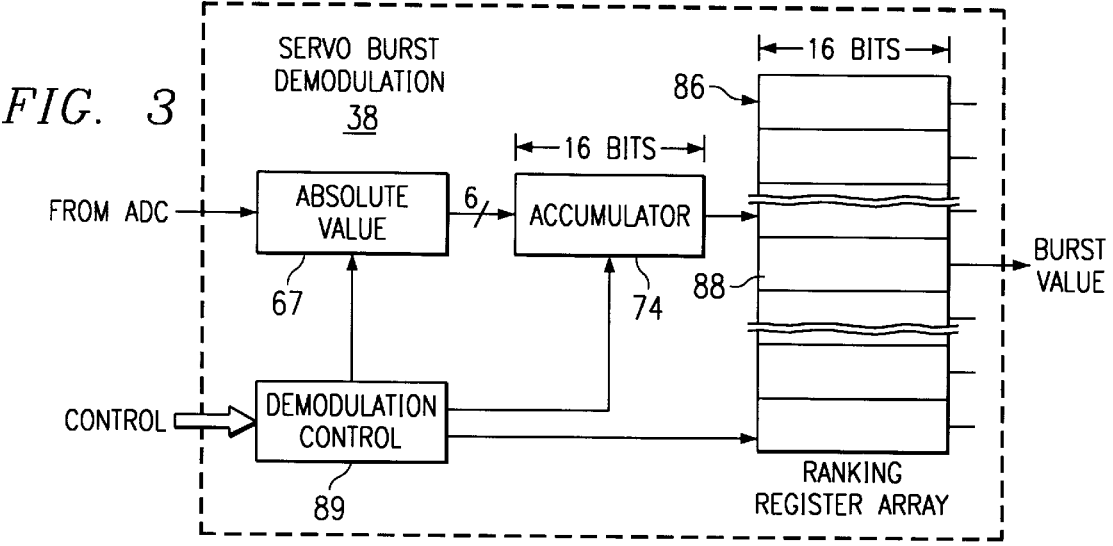
FIG. 3 is a block diagram of a servo burst demodulation circuit which is a component of the system of FIG. 1.
Figure 4:
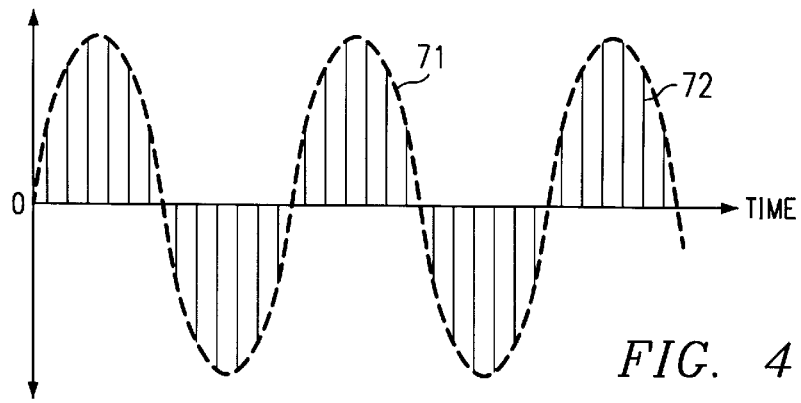
FIG. 4 is a graph of a servo burst signal, and a series of digital samples taken from that servo burst signal.

The servo burst demodulation circuit 38 of FIG. 1 is shown in more detail in FIG. 3. The demodulation circuit 38 includes an absolute value circuit 67, which has an input coupled to the output of the ADC 33. The absolute value circuit 67 determines and outputs the absolute value of each digital sample generated by the ADC 33. If the digital samples are represented by signed binary numbers, this may involve simply removing the sign bit. The absolute value circuit 67 thus operates somewhat like a full-wave rectifier circuit. In this regard, FIG. 4 is a graph representing the output of the ADC 33, where the broken line 71 represents the envelope of a burst signal, and the solid lines 72 represent the positive and negative samples taken by the ADC 33. For convenience, the burst signal is shown in FIG. 4 as having an envelope 71 which is a pure sinusoid, although the envelope may in reality have the shape of a Lorentzian signal rather than a pure sinusoid.

Figure 5:
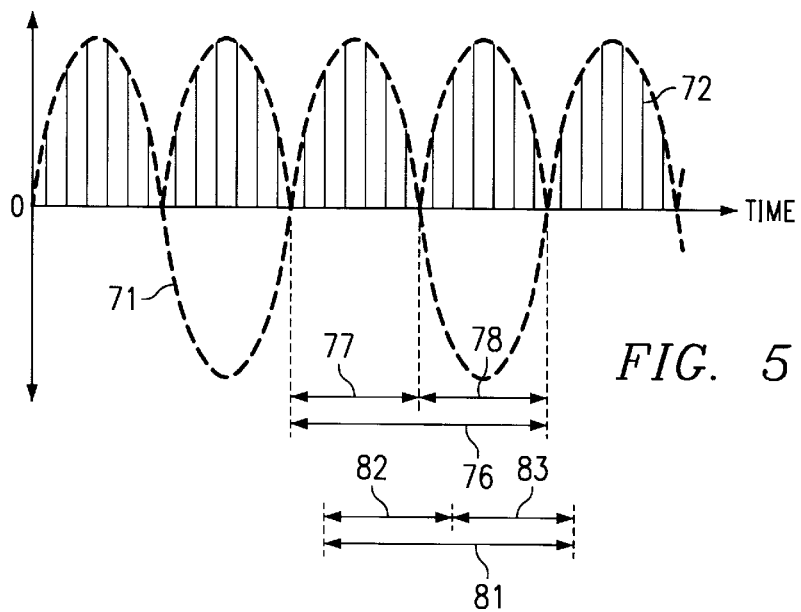
FIG. 5 is a graph similar to FIG. 4, but showing the absolute value of each of the digital samples of FIG. 4.

FIG. 5 shows the output of the absolute value circuit 67, after the negative samples from the ADC 33 have each been converted to a positive sample, in order to effectively achieve full-wave rectification. As evident from FIGS. 4 and 5, the disclosed embodiment utilizes oversampling, which means taking more samples than would be involved in Nyquist sampling, where the number of samples is twice the highest frequency. The oversampling in the disclosed embodiment involves about twelve samples per full cycle of the burst signal, or in other words about six samples per half-cycle.

Figure 6:
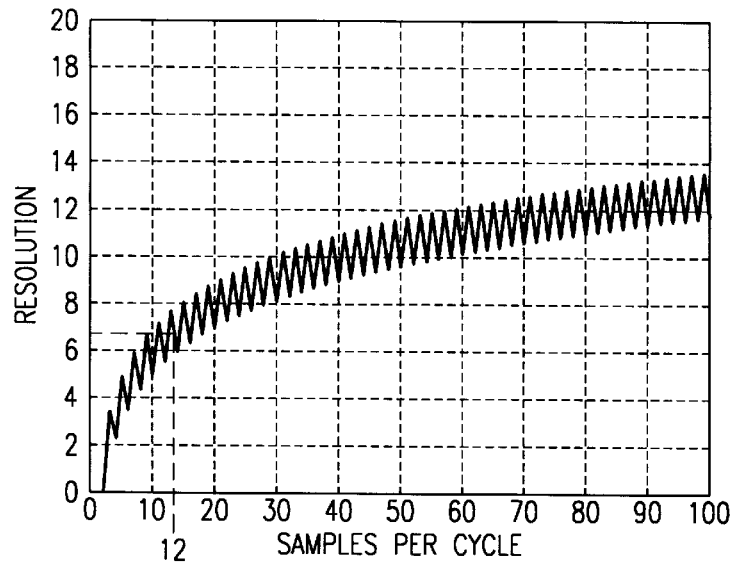
FIG. 6 is a graph showing the resolution obtained for various rates of sampling a burst signal.

In this regard, FIG. 6 is a graph showing the resolution obtained as a function of the number of samples taken in a full cycle. It will be noted that resolution increases sharply as the number of samples is increased from one to about ten or twelve, and then increases gradually as the number of samples is increased beyond ten or twelve. The disclosed embodiment therefore uses about twelve samples per full cycle, as mentioned above, although it will be recognized that the specific sampling rate can be varied within the scope of the present invention. In order to optimize the operation of the demodulation circuit, the sampling frequency should be selected to be slightly different from an integer multiple of the frequency of the burst signal.

In FIG. 3, the output from the absolute value circuit 67 is supplied to an accumulator 74, which adds up successive digital values supplied to it by the absolute value circuit 67. More specifically, the accumulator 74 sums the sample values supplied to it during a specified time interval. For example, with reference to FIG. 5, the accumulator 74 may add up the samples corresponding to a full cycle 76 of the waveform. Alternatively, it may add up the samples for a half-cycle, as shown at 77 or 78. Alternatively, the time interval could correspond to a quarter cycle of the waveform, or some integer multiple of a half cycle or a full cycle. It will be recognized that, for any such time interval, the accumulator 74 essentially integrates the energy of the burst signal during that time interval.

For convenience, the time intervals 76–78 are shown in FIG. 5 as being synchronized to zero-crossing points of the waveform. However, for a time interval which is a half-cycle or a full cycle, or a multiple thereof, the time interval need not be synchronized to a zero-crossing point, but may be offset in time by an arbitrary amount, for example as shown at 81, 82 and 83 in FIG. 5. Whether or not there is synchronization may depend on the particular operating mode of the circuit.

With reference to FIG. 3, at the end of a time interval during which the accumulator 74 has been adding up sample values, the accumulated value or sum is transferred to a ranking register array 86. Then, the accumulator 74 is cleared, and immediately begins adding up samples for another time interval, which is identical in duration to the first time interval. As the ranking register array 86 receives each accumulated value, it inserts the value in an unused register of the array 86. Then, if necessary, the array automatically shifts the values among respective registers so that the values are arranged or ranked by magnitude, from largest to smallest.

At the end of a given burst signal, such as burst A, the register array 86 will be completely filled with a large number of accumulated values, each corresponding to a respective different time interval during a burst signal. The middle register 88 of the array 86, which has the same number of registers above it as below it, will inherently contain the median value. Therefore, at the end of the burst signal, the contents of register 88 are output as the burst value determined for that burst signal. The servo burst demodulation circuit 38 is then reset, so that it can begin demodulating the next successive burst signal, such as burst B. The control of the demodulation circuit 38, in the manner described above, is effected by a demodulation control circuit 89, which may be a state machine. The register array 86, by ranking the accumulated values and selecting the median accumulated value to be the burst value, carries out a form of filtering.

Figure 7:
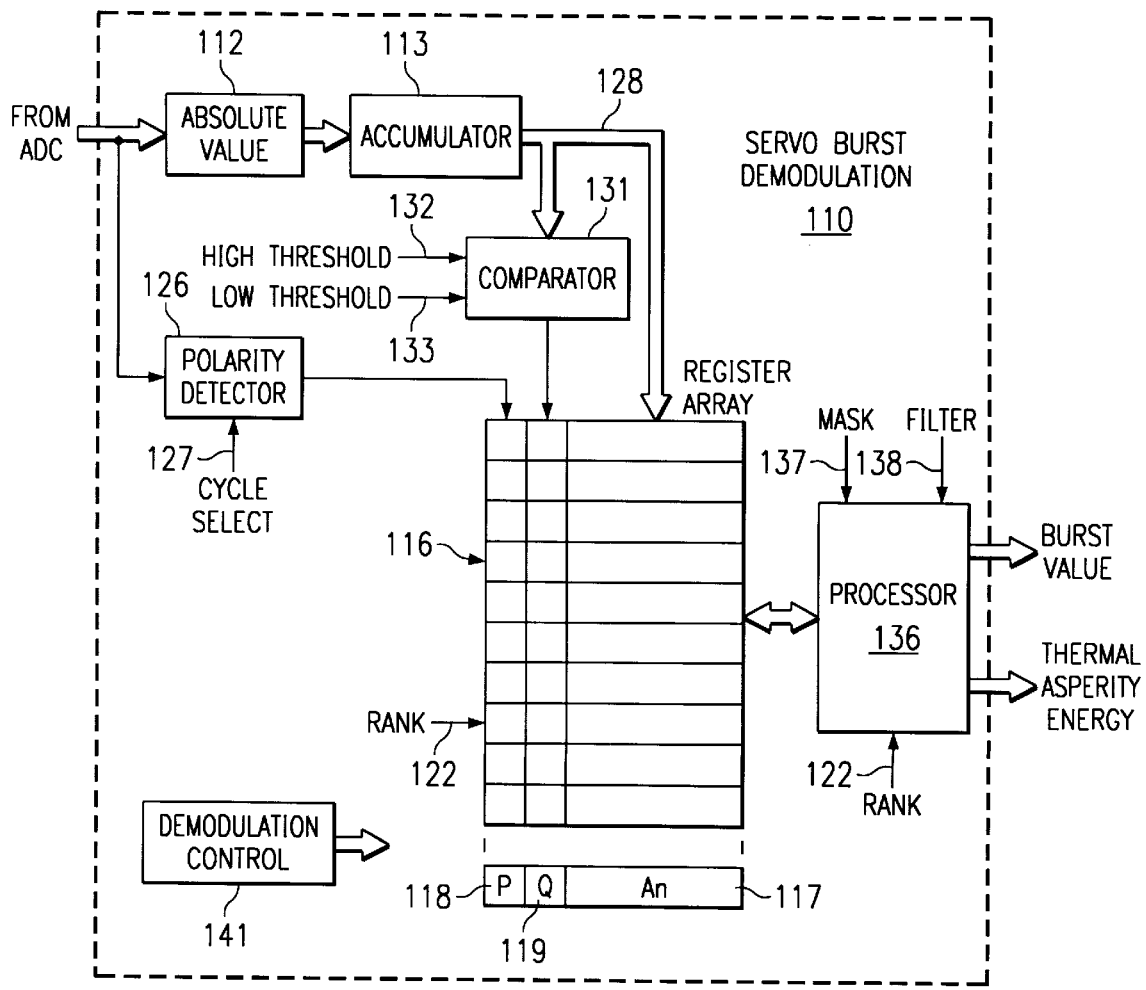
FIG. 7 is a block diagram of a servo burst demodulation circuit, which is an alternative embodiment of the demodulation circuit of FIG. 3.

FIG. 7 is a block diagram of a further servo burst demodulation circuit 110, which is an alternative embodiment of the demodulation circuit 38 shown in FIG. 3, and which can be substituted for the demodulation circuit 38 in the system 10 of FIG. 1. The demodulation circuit 110 of FIG. 7 includes an absolute value circuit 112 which is responsive to the output of the ADC 33, and which is functionally equivalent to the absolute value circuit shown at 67 in FIG. 3. The demodulation circuit 110 of FIG. 7 also includes an accumulator 113, which receives the output of the absolute value circuit 112, and which is functionally equivalent to the accumulator 74 shown in FIG. 3.

The demodulation circuit 110 includes a register array 116, which is slightly more sophisticated than the register array 86 shown in FIG. 3. More specifically, each register of the array 116 includes a portion 117 that can contain an accumulated value An received from the accumulator 113, an associated "P" bit 118 representing a polarity, and an associated "Q" bit 119 representing a quality condition. The polarity and quality bits 118 and 119 are discussed in more detail later.

The register array 116 can operate in one of two different modes, selected by a rank control signal 122. In particular, if the rank control signal 122 is a logic high, the register array 116 will organize or rank the contents of its registers based on the magnitude of the accumulation values 117, in a manner analogous to the operation of the register array 86 of FIG. 3. On the other hand, if the rank control signal 122 is a logic low, the accumulated values 117 from the accumulator 113 will be entered into successive registers of the array 116 in the order they are received from the accumulator 113, so that the accumulation values An are arranged chronologically, rather than by magnitude.

A polarity detector circuit 126 has an input coupled to the output of the ADC 33. The polarity detector circuit 126 thus has access to the digital samples before they reach the absolute value circuit 112, or in other words when there may be both positive and negative samples, as shown in FIG. 4. If the demodulation circuit 110 is operating in a mode where the accumulator 113 is summing samples for a time interval which is a half cycle or less, and which is synchronized to the zero-crossing points of the waveform, the polarity detector circuit 126 will be enabled by a cycle select signal 127, will output a logic high if the accumulator 113 is currently summing positive samples, and will output a logic low if the accumulator 113 is currently summing negative samples. At the end of the time interval, when the accumulated value from the accumulator 113 is transferred at 128 to the register array 116, the output of the polarity detector 126 is simultaneously transferred to the register array 116 to serve as the P or polarity bit 118 associated with that accumulated value An.

During other modes of operation, for example where the accumulator 113 is summing samples for a time interval which is greater than a half-cycle, or which is not synchronized to zero-crossing points, the cycle select signal 127 disables the polarity detector circuit 126, causing the polarity detector circuit 126 to continuously output a logic high voltage, so that every accumulated value An which is stored in the register array 116 has associated with it a P bit which is a logic 1.

Demodulation circuit 110 also includes a comparator circuit 131, which compares the accumulated value generated by the accumulator 113 to both a high threshold 132 and a low threshold 133. If the accumulated value is above the high threshold 132 or below the low threshold 133, then the comparator circuit 131 outputs a logic low voltage. On the other hand, if the accumulated value is between the high and low thresholds 132 and 133, the comparator circuit 131 outputs a logic high voltage. When each accumulated value An from the accumulator 113 is loaded into the register array 116, the output of the comparator 131 is also loaded into the register array as the associated Q bit or quality bit 119. If the Q bit is a logic 0, it indicates that the corresponding accumulated value An is of questionable quality and has been disqualified, whereas if the Q bit is a logic 1 it indicates that the corresponding accumulated value An appears to be of acceptable quality. The purpose of the quality bit Q is to avoid the use of information which may be distorted or erroneous.

For example, if the read/write head 21 briefly overheats, the magnitude of its output signal may increase dramatically, and the increase may last through a portion of a particular burst signal, through the entire burst signal, or even through an entire servo sector. This type of temporary phenomenon is known as a thermal asperity. To the extent that this causes the accumulator 113 to output accumulated values which are greater than the high threshold 132, the associated Q bit will be set to logic 0, so that the corresponding accumulated value An will be subsequently ignored, as discussed in more detail later.

The demodulation circuit 110 also includes a processor 136, which is operationally coupled to the register array 116, and which receives the rank control signal 122. The processor L36 further receives a mask control signal 137, and a filter control signal 138. The mask control signal 137 is a logic signal which affects the manner in which the processor utilizes the Q bit 119 to process information from the register array 116, as discussed in more detail later. The filter control signal 138 is a logic signal which specifies whether the filtering technique used by the processor 136 to select the burst value is to involve use of a median or a mean, as also discussed in more detail later. The demodulation circuit 110 further includes a demodulation control circuit 141, which produces the control signals for the other components in the demodulation circuit 110, and which is functionally equivalent to the demodulation circuit shown at 89 in FIG. 3.

Figure 8A:
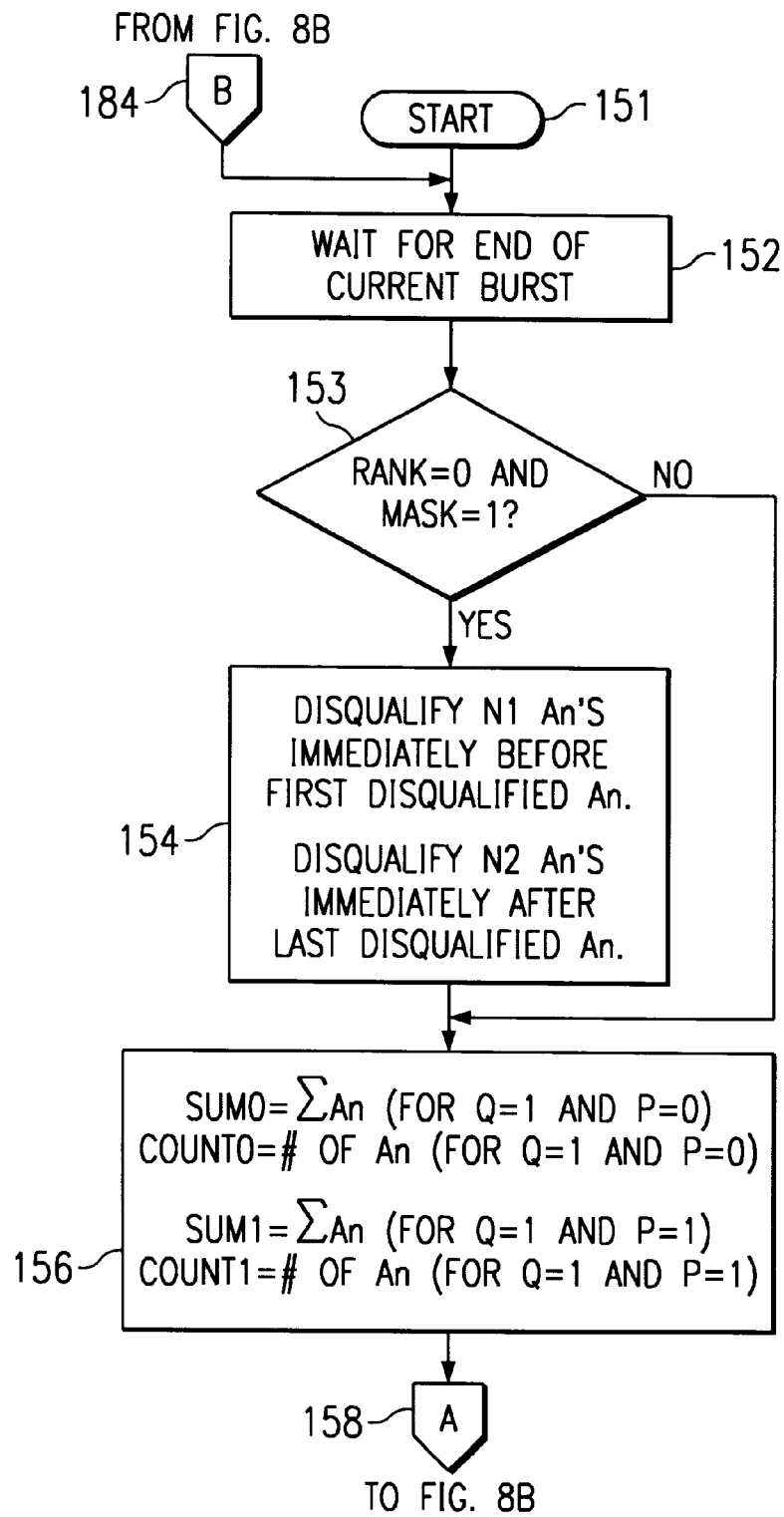
FIG. 8 is a flowchart depicting the operation of a processor which a component of the demodulation circuit of FIG. 7.
Figure 8B:
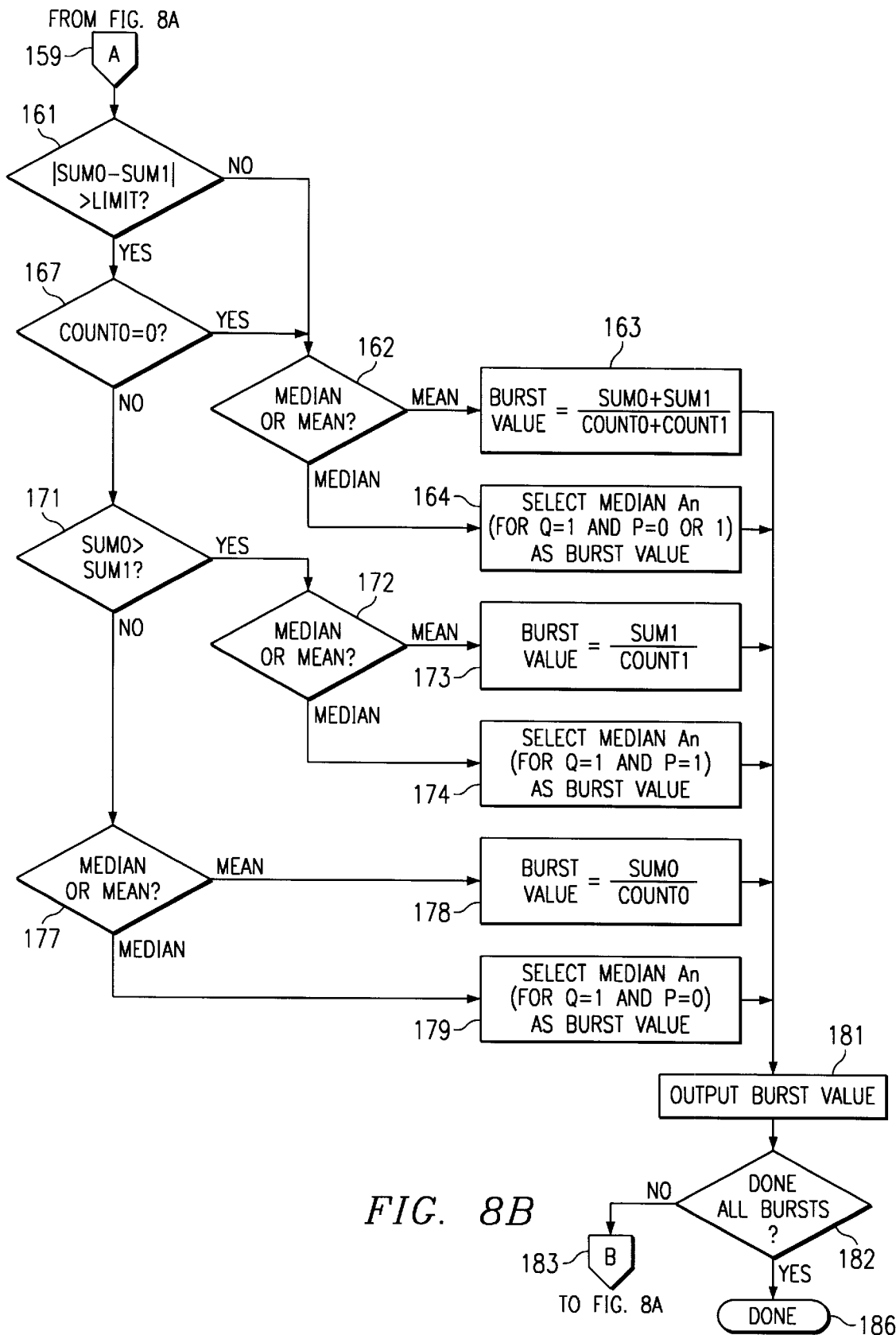

The operation of the processor 136 is described in more detail with reference to FIG. 8, which is a flowchart depicting the operation of the processor 136. The flowchart of FIG. 8 begins at block 151, and proceeds to block 152, where the processor 136 waits for the current burst signal to end, at which time the register array 116 will contain all of the information which has been derived from the current burst signal.

Control then proceeds to block 153, where the processor 136 checks to see whether the rank control signal 122 is a logic low and the mask control signal 137 is a logic high. If the mask control signal 137 is a logic high, then the processor 136 is to carry out a mask function, which is described below in association with block 154, and which requires that the information in the register array 116 be arranged chronologically rather the by magnitude. If the rank control signal 122 is a logic low, then the information in the register array 116 is arranged chronologically, rather than by magnitude. If both conditions are met, then the processor proceeds to block 154.

In block 154, the processor looks for any entries in the register array which have the Q bit set to logic 0, or in other words entries which have been disqualified by the comparator 131. When it finds one or more successive registers which contain disqualified information, the processor 36 sets the Q bit to logic 0 in N1 registers immediately before the first such disqualified register, and also sets the Q bit to logic 0 in N2 registers immediately after the last such disqualified register entry. As discussed above, the most common cause of disqualified entries will be a thermal asperity. In the case of a thermal asperity, there maybe some data that immediately precedes or follows the data disqualified by the comparator 131, and that has an accumulated value which is slightly less than the high threshold 132 and which thus was not disqualified by the comparator 131, but which should be disqualified in order to completely eliminate the effects of the thermal asperity. This is why, in block 154, the processor disqualifies several accumulated values immediately before and several accumulated values immediately after the group of accumulated values that were disqualified by the comparator 131.

From block 154, the processor 136 proceeds to block 156. Alternatively, if the processor had determined at block 153 that both of the specified conditions were not met, the processor would have skipped block 154 by proceeding directly from block 153 to block 156. In block 156, the processor 136 calculates the sum of all accumulated values An in the register array 116 for which the quality bit Q is a logic 1 and the polarity bit P is a logic 0, and then saves the result in SUM0. Then, the processor saves the number of such accumulated values as COUNT0. The processor carries out a similar calculation for the entries for which the quality bit Q is a logic 1 and the polarity bit P is a logic 1, saving the results as SUM1 and COUNT1.

Then, the processor proceeds at 158 and 159 to block 161. In block 161, the processor calculates the absolute value of the difference between SUM0 and SUM1, and compares the result to a predetermined limit. In essence, if the circuit 110 is operating in a mode where the polarity detector circuit 126 is enabled, the processor 136 is comparing the total energy associated with positive half waves of the burst signal to the total energy associated with negative half waves of the burst signal. If the burst signal is symmetric in amplitude, the total positive energy and total negative energy should be approximately equal, and the absolute value of the difference should be below the predetermined limit.

On the other hand, if the burst signal has distortion which makes it asymmetric in amplitude, for example because the read/write head 21 is temporarily operating in a nonlinear portion of its transfer function, one of the total positive energy and the total negative energy will be significantly larger than the other thereof, such that the absolute value of the difference is greater than the predetermined limit. Alternatively, if the demodulation circuit 110 is operating in a mode where the polarity detector 126 is disabled, then as discussed above the polarity bits P will be all be set to a logic 1, the value SUM0 will necessarily be zero, and the processor will necessarily determine in block 161 that the absolute value of the difference exceeds the predetermined limit.

Assuming it is determined in block 161 that the absolute value of the difference is less than the predetermined limit, then the processor will proceed to block 162, where it will check the filter control signal 138 to determine whether the filtering function to be carried out involves determining the burst value by taking the median of certain accumulated values in the register array, or by taking the mean or average of these values. If it is determined at block 162 that the burst value to be the mean, then at block 163 the burst value is calculated by dividing the sum of SUM0 and SUM1 by the sum of COUNT0 and COUNT1. Alternatively, if is determined at block 162 that the burst value to be calculated as the median, then control proceeds to block 164, where the processor takes all accumulated values An for which the quality bit Q is a logic 1, and selects the median of these accumulated values as the burst value.

Returning to block 161, and as discussed above, if the demodulation circuit 110 is operating in a mode where the polarity detector circuit 126 is disabled and sets every polarity bit P to a logic 1, block 161 will necessarily determine that the absolute value of the calculated difference is greater than the predetermined limit, and will cause control to proceed to block 167. Block 167 is a check for this particular condition. In particular, if all of the entries in the register array have a polarity bit which is a logic 1, then the value of COUNT0 will necessarily be zero, causing control to proceed from block 167 to block 162, because there is really no signal asymmetry. On the other hand, if the value of COUNT0 is not zero, then there is signal asymmetry, and control proceeds from block 167 to block 171.

In block 171, the processor checks to see which of the values SUM0 and SUM1 is larger. The processor effectively ignores the larger of SUM0 and SUM1, along with the information used to generate it. In particular, if SUM0 is determined to be larger, the processor proceeds to block 172, where it checks the filter control signal 138 to determine whether it should calculate a median or mean. If it is to calculate a mean, it proceeds to block 173, where it calculates the burst value as SUM1 divided by COUNT1. Alternatively, if it is to calculate a median, it proceeds from block 172 to block 174, where it takes all accumulated values An for which the quality bit Q is a logic 1 and the polarity bit P is a logic 1, and selects the median value from these accumulated values to serve as the burst value.

On the other hand, if it were determined at block 171 that the value of SUM1 was larger than the value of SUM0, then the processor would proceed to block 177, where it would check the filter control signal 138 to determine whether to calculate a median or mean. If it is to calculate a mean, then it would proceed to block 178, where it would calculate the burst value as SUM0 divided by COUNT0. Alternatively, if is to calculate a median, it would proceed to block 179, where it would select all of the accumulated values An for which the quality bit Q is a logic 1 and the polarity bit P is a logic 0, and then select the median value from these accumulated values to serve as the burst value.

From each of blocks 163–164, 173–174 and 178–179, the processor proceeds to block 181, where it outputs the calculated burst value. The processor then proceeds to block 182, where it checks to determine whether all burst signals have been processed. If not, it returns at 183 and 184 to block 152, in order to handle the next burst signal. Otherwise, it proceeds from block 182 to block 186, which represents completion of the servo burst processing by the processor 136.

As discussed above, the demodulation circuit 110 of FIG. 7 selectively determines the burst value as either the median or the mean of a selected set of accumulated values. However, it will be recognized that the demodulation circuit 110 could alternatively use some other filtering function to determine the burst value. For example, the circuit 110 could determine the mode of the set of accumulated values. As is known, the mode is the most frequently occurring accumulated value An in the selected set of accumulated values.

As also discussed above, the demodulation circuit 110 can detect and compensate for positive/negative asymmetry of the burst signal waveform. In an analogous manner, when doing quarter cycle accumulation in synchronism with the burst signal frequency, the demodulation circuit could detect and compensate for leading/trailing edge asymmetry of the burst signal waveform.

The present invention provides a number of technical advantages. One such technical advantage is that the filtering of accumulated or integrated values provides improved noise performance, and permits reduction or elimination of the effects of certain common hard disk drive problems, such as drop-ins, drop-outs, fading, and asymmetries. A further technical advantage is the provision of greater flexibility to adjust both the integration and the filtering in order to optimize the performance of the servo demodulation circuit for a particular application. A further advantage is that use of half-cycle integration permits positive/negative pulse asymmetry to be detected and compensated, and the use of quarter. cycle integration permits leading and trailing shape asymmetry to be detected and corrected.

Although two embodiments have been illustrated and described in detail, it should be understood that various changes, substitutions, and alterations can be made therein without departing from the spirit and scope of the present invention. For example, the disclosed embodiments use filtering techniques which involve the determination of a median or mean value, but it will be recognized that a variety of other filtering techniques could be used, such as the determination of a mode value. As a further example, the disclosed embodiments involve a sampling rate of twelve samples for each full cycle of a servo burst signal, but it will be recognized that a variety of higher or lower sampling rates could be used.

As yet another example, the present application discloses exemplary techniques that can be used to detect and compensate for problems such as waveform asymmetry due to thermal asperity, but it will be recognized that there are other techniques which can be used to detect and/or correct such problems, and which lie within the scope of the present invention. It should also be recognized that direct connections disclosed herein could be altered, such that two disclosed components or elements would be coupled to one another through an intermediate device or devices without being directly connected, while still realizing the present invention. Other changes, substitutions and alterations are also possible without departing from the spirit and scope of the present invention, as defined by the following claims.

What is claimed is:

1. A method of demodulating a servo burst signal from a read head of a disk drive, comprising the steps of:

oversampling the servo burst signal during each of a plurality of successive time intervals, in order to obtain a plurality of samples for each said time interval;

summing the plurality of samples for each said time interval in order to obtain a respective accumulation value for each said time interval; and determining a burst value for the servo burst signal by applying a filtering function to a set of said accumulation values;

wherein said time interval is a half cycle of the servo burst signal, and wherein said determining step includes the steps of summing a first group of the accumulation values which correspond to positive half cycles of the servo burst signal and summing a second group of the accumulation values which correspond to negative half cycles of the servo burst signal, thereafter applying the filtering function only to the accumulation values of said first group if said second sum exceeds said first sum by a predetermined amount, and applying the filtering function only to the accumulation values of said second group if said first sum exceeds said second sum by a predetermined amount.

2. A method according to claim 1, including after said oversampling step and prior to said summing step the step of determining the absolute value of each of the samples, said summing step being carried out using the absolute values of the samples.

3. A method of claim 1, wherein said set of accumulation values includes all of the accumulation values determined during said summing step.

4. A method according to claim 1, wherein said filtering function includes the step of determining a mean of said set of accumulation values.

5. An apparatus according to claim 1, wherein said time interval is a full cycle of the servo burst signal.

6. A method of claim 1, wherein said time interval is a half cycle of the servo burst signal.

7. A method according to claim 1, wherein said time interval is a quarter cycle of the servo burst signal.

8. A method of demodulating a servo burst signal from a read head of a disk drive, comprising the steps of:

oversampling the servo burst signal during each of a plurality of successive time intervals, in order to obtain a plurality of samples for each said time interval;

summing the plurality of samples for each said time interval in order to obtain a respective accumulation value for each said time interval; and determining a burst value for the servo burst signal by applying a filtering function to a set of said accumulation values;

wherein said filtering function includes the step of determining either a median of said set of accumulation values or a mean of said set of accumulation values.

9. A method of demodulating a servo burst signal from a read head of a disk drive, comprising the steps of:

oversampling the servo burst signal during each of a plurality of successive time intervals, in order to obtain a plurality of samples for each said time interval;

summing the plurality of samples for each said time interval in order to obtain a respective accumulation value for each said time interval; and determining a burst value for the servo burst signal by applying a filtering function to a set of said accumulation values;

including after said summing step and prior to said determining step the step of selectively rejecting some of the accumulation values, and carrying out said determining step using only accumulation values other than the rejected accumulation values.

10. A method according to claim 9, wherein said rejecting step is carried out by rejecting each of the accumulated values which are outside a predetermined range.

11. A disk drive apparatus, comprising:

a rotating magnetic disk having information stored thereon, the information including servo burst information;

a read head which is supported adjacent said magnetic disk and which is operative to read information therefrom, the read head generating a servo burst signal from the servo burst information;

an analog-to-digital converter to oversample the servo burst signal from the read head during each of a plurality of successive time intervals, in order to obtain a plurality of samples for each said time interval;

an accumulator for summing the plurality of samples from each said time interval in order to obtain a respective accumulation value for each said time interval; and a filtering arrangement which is operative to determine a burst value for the servo burst signal by applying a filtering function to a set of the accumulation values;

wherein said filtering arrangement is operative to implement the filtering function by determining either a median accumulation value from the set of accumulation values or a mean accumulation value from the set of accumulation values.

12. An apparatus according to claim 11, wherein each said time interval is one of a quarter cycle of the servo burst signal, a half cycle of the servo burst signal, a full cycle of the servo burst signal, and an integer multiple of a full cycle of the servo burst signal.

13. An apparatus according to claim 11, including an absolute value circuit disposed between said analog-to-digital converter and said accumulator.

14. An apparatus according to claim 11, wherein said filtering arrangement is operative to selectively reject some of the accumulation values determined in said accumulator, said set of accumulation values being the non-rejected accumulation values.

15. An apparatus according to claim 11, wherein said filtering arrangement is operative to implement the filtering function by determining the mean of the set of accumulation values.

* * * * *